United States Patent Office 3,715,037
Patented Feb. 6, 1973

3,715,037
NOVEL LUBRICATING OIL SYSTEM AND OIL FILTER FOR INTERNAL COMBUSTION ENGINES
Shih-en Hu, Westfield, and Jerome Geyer, Elizabeth, N.J., assignors to Esso Research and Engineering Company
Filed Dec. 16, 1968, Ser. No. 784,221
Int. Cl. B01d 39/00
U.S. Cl. 210—501      7 Claims

ABSTRACT OF THE DISCLOSURE

A lubricating oil treatment system for internal combustion engines involves the circulation and recirculation of the oil from the engine through an oil filter and the return of the filtered oil to the engine. The novel system contains a filter cartridge within the filter chamber which cartridge is charged with at least one relatively oil-insoluble solid inorganic or organo-inorganic simple or binary, or complex or ternary, compound containing a chemically bound transition metal selected from the group consisting of metals of Groups I–B, II–B, III–B, IV–B, V–B, VI–B, VII–B and VIII of the Periodic Table of the Elements. The passage of the circulating oil in the system may be, optionally, through a chamber in the system which is ahead of or after the oil filter, which chamber contains the solid particles of such a compound or mixture of compounds retained within the chamber and in place of or in addition to such compounds being placed within the oil filter.

DESCRIPTION OF THE INVENTION

Figure 1:
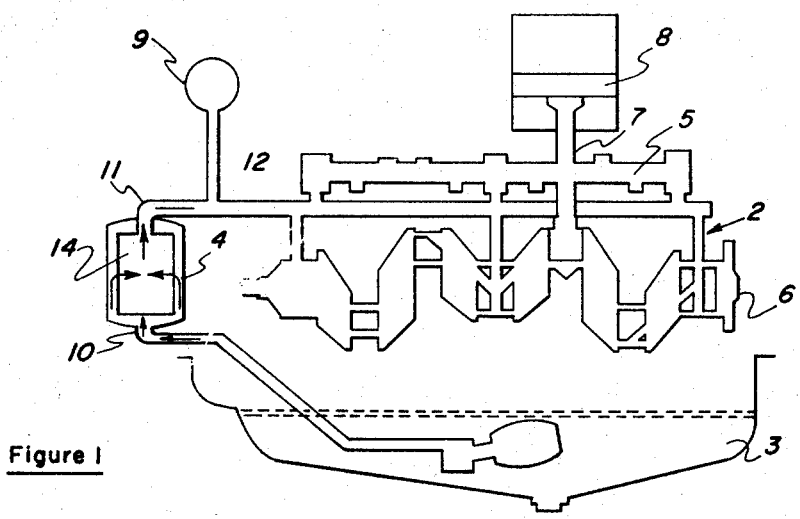

The present invention relates to lubricating oil circulating systems used in association with internal combustion engines and involves the circulation of mineral lubricating oil from the crankcase of an internal combustion engine through an oil filter or oil contacting chamber and the return of the filtered or treated oil into the internal combustion engine for reuse therein. More particularly, the invention relates to oil filters and optionally to a chamber ahead of or after the oil filter for contacting the lubricating oil with inorganic or organo-inorganic compounds of the transition metals selected from the group consisting of metals of Groups I–B, II–B, III–B, IV–B, V–B, VI–B, VII–B and VIII of the Periodic Table of the Elements wherein such compounds are contained in the oil filter, in a filter cartridge contained within the oil filter, or in the contacting chamber ahead of or after the oil filter. In descending order of preference Group VIII is most effective, followed by Groups III–B through VII–B, and finally, Groups I–B and II–B. These transition metal compounds are simple (binary); or complex (ternary), in nature. By incorporating such compounded transition metals into the oil filter or the oil contacting chamber, in the solid state or impregnated into filter packing materials or other inert carriers and retaining them thereof, it is possible to maintain the lubricating oil in a fresher condition, free of sludge and decomposition products and with the internal engine surfaces being maintained in a cleaner condition with a minimum of rust forming or other corrosion tendencies present than has heretofore been thought to be possible of attainment.

Mineral lubricating oils, especially those used for the lubrication of internal combustion engines, are required to withstand severe superatmospheric temperatures. With the advent of various devices being presently incorporated into engine construction designed to close off the oil crankcase from the atmosphere, less cooling effects are possible in the crankcase which gives rise to still higher temperatures in the oil than has heretofore been usual. The oils, therefore, are subjected to even more severe degradation conditions and steps must be taken to minimize or prevent, insofar as possible, degradation of such oils. Additionally, the products of combustion of the fuel-air mixtures are not completely eliminated by the exhaust system, being forced or blown by the piston rings, into the crankcase, so that they contaminate the lubricating oil as well. These combustion products, chiefly the oxides of nitrogen, are believed to be precursors of sludge formation within the lubricating oils once they come in contact with the lubricating oil.

The present invention is designed to treat the lubricating oil containing various oxidative-degradation products and these products of combustion so as to minimize the formation of sludge in the lubricating oil and to maintain a stability in the oil over longer periods of time. The effective removal from the oil of the oxidized or partially oxidized products contained in the blow-by and which thus find their way into the lubricating oil is a major object of the invention. The use of the hereinbefore mentioned transition metal compounds effectively and unexpectedly accomplishes this purpose, thus achieving far greater periods of operation between oil changes. At least these harmful products are rendered less harm, if not actually completely removed, by such treatment. This is for the reason that longer periods of operation under high temperature conditions are possible due to the fact that sludge formation is considerably delayed or minimized where the oil is contacting the metal compounds in an oil filter or a contacting chamber. The transition metal compounds are effective by reason of the complexing of these products of combustion with the transition metal compounds. Since these complexed products remain and are retained in the oil filter or in the contacting chamber, they are effectively removed from the oil and are, hence, no longer deleteriously aiding in the formation of sludge.

It is not intended, however, that this invention be limited by any theory of operation such as that described above, but the fact of the matter is that the transition compounds do provide an advantageous overall minimizing of sludge formation. The nitrogen in the air introduced into the combustion chambers becomes fixed after combustion as oxides of nitrogen. The oxides of nitrogen, by reason of blow-by, find their way into the crankcase oil and are, in fact, effectively removed or rendered ineffective by the novel treatment hereinafter more fully described.

Various attempts have been made in the past to treat lubricating oils with inorganic substances which are substantially of an oil-insoluble nature but these attempts for the most have involved the use of basic compounds, such as calcium hydroxide, calcium carbonate, the alkali metal bases and the like. These treatments were designed to neutralize the acidity developed in the oil through the continued use of the oil with the resultant breakdown thereof. Thus, for example, Maverick et al., 1,914,999, treats oils with a solid base such as sodium oxide, potassium oxide, magnesium oxide or the corresponding carbonates. Fairlie, 2,262,526, incorporates alkaline earth metal basic compounds in the oil filters for the purpose of removing acidity. Additionally, other patents, such as Sarui, 3,154,488, treat lubricating oils either to regenerate them with metal alloys of magnesium, aluminum, zinc, tin or antimony; and, finally, Puddington, 2,852,454, shows the treatment of lubricating oils by adding to the oil filters sodium-solder alloy compounds, or metallic calcium-tin-lead solder compounds for the purpose of minimizing acidity and sludge formation. In almost all instances involving prior attempts to improve the useful life of lubricating oils, the approach has been to neutralize the developed acidity of the oil during use or to incorporate a reducing agent which will serve as an antioxidant which, in turn, will minimize the oxidative breakdown of the constituents of the oil.

The instant novel process affords, surprisingly, a very useful method of removing of the products of combustion that find their way into the lubricating oil during its use. Additionally, where the transition metal compound employed also has a reducing action, it is doubly useful for it is not only capable of forming a complex with the products of combustion but it is likewise useful as an antioxidant as well. Specifically, the transition metals whose compounds are useful are selected from the following groups: I-B, II-B, III-B, IV-B, V-B, VI-B, VII-B, and VIII. These groupings are as outlined in the "Periodic Table of the Elements" published by E. H. Sargent & Company, Chicago, Ill., copyright 1964. Specifically, the preferred metals are: titanium, vanadium, chromium, manganese, iron, cobalt, nickel, copper, zinc, zirconium, cadmium, molybdenum, ruthenium and osmium. Any of the other members of these groups will work but generally they are not readily available commercially or they are so expensive that they are not justified for use.

The compounds that are used are of two types. In all cases, they contain a transition element but its state of oxidation has been found to be immaterial.

The first type of compound is a simple or binary type compound. It involves a transition metal present as the cation. It can be fully oxidized or it can be of a reducing nature. The efficacy of the binary compounds does not depend on the state of oxidation of either the cation or the anion moieties thereof. The anion moiety is of a simple or non-complexed nature such as iodides, bromides, fluorides, carbonates, acetates, oxalates, oxides, alkoxides, thiocyanates, cyanides, phosphates, phosphites, sulfates, oxysulfates, oxyhalides, sulfides, sulfoxylates, hyposulfites, sulfites, dithionates, dithionites, phosphides, hypophosphates, hypophosphites, orthophosphates, orthophosphites, meta and hypophosphates and phosphites, etc.

A binary or simple compound is defined as a transition metal only, as the cation, together with the aforementioned simple or complexed anions.

The second type of compound is a complex or ternary type compound wherein the transition metal may be present in either the anion moiety or the cation moiety. In one form the cation contains not only a transition metal but a complex therewith, as well, at least one ligand being in association with the metal as part of a unitary cation. The anion moiety may be a single element, a group of elements, such as $SO_4$ or a complexed group of elements such as ferrocyanide. The cation complexing agents (ligands) with the transition metal, are such as ammino, amino, cyano, amido, chloro, diodo, bromo, hydroxy, oxalic, sulfato, carbonyl, thioaryl, glycyl, etc. The complexing agents as part of the cation are designated as Lewis bases, i.e. an acidic, basic or mixed ligand.

Compounds such as nickel carbonyl, cobalt carbonyl, etc., are sometimes not considered to be composed of a metal cation and a carbonyl anion, although they are, in fact, compounds or independent complexes wherein the metal is considered to actually be in a zero valence state. For the purposes of the present invention, such compounds or complexes are considered to be simple or binary compounds and are useful in practicing the process of the present invention.

The simple or binary inorganic compounds are exemplified by cobaltic chloride, cobaltic sulfate, and manganese sulfate. The complexed or ternary compounds of organo-inorganic nature or of pseudo organo-inorganic nature may be exemplified by ferrous hexammino chloride or ferric hexammino chloride, tris (ethylene diamine) cobaltic sulfate, ammonium manganese sulfate and amino mercuric chloride.

In general, it is less desirable to use and it is preferred to avoid the use of, transition metal compounds which contain nitroso, nitro, nitrite or nitrate radicals. Such binary and ternary compounds may be used because they are efficacious in inhibiting sludge formation and additionally, they are also useful by reason of their antirust properties. It is believed that, in sludge formation, the products of combustion as blow-by, in large part, are composed of oxides of nitrogen and are present in the crankcase oils as such. In spite of the use of transition metal compounds whose anions contain or are composed of one or more of the above material radicals, the transition metal still functions to complex or bond these oxides of nitrogen and this removes sulfoxides from the oil. However, since both cobalt and manganese are transition metals and since they do form complexes with ligands such as the ammino complexes, they are useful compounds for they will complex in either their reduced or fully oxidized state and they do successfully function in effectively removing the sludge precursors from the oil.

The hereinafter mentioned transition metal compounds are set forth without regard to their specific metallic valence state so that reference to osmium chlorides, for example, is intended to specifically cover all of the chlorides of osmium, i.e. the dichloride, trichloride, tetrachloride, hexachloride, etc., in all other possible chlorides of osmium. Similarly, for other anions of the multivalent metals, all possible compounds are to be included where the anion is mentioned in the plural form.

The binary compounds are many and varied in nature; they are employed in solid form in an oil filter or impregnated on a carrier and placed in the oil filter or in a separate treating chamber as hereinbefore described. The use of the plural in designating the anion is intended to include all the valence states of the cation with that anion; thus, chromium chlorides, includes the di, tri, and hexachlorides. Examples of these solid inorganic compounds are as follows: copper chlorides, bromides, iodides, iodates, chromous or chromic hydroxide, bromides, chlorides, fluorides, iodides, oxide, nitride, phosphate, phosphide, selenide, sulfide, telluride, cobaltous or cobaltic fluorides, bromides, chlorides, iodides, acetate, oxide phosphide, thiocyanate; ferrous or ferric oxalate, acetate, bromides, chlorides, fluorides, iodides, sulfate, phosphate, selenate, thiocyanate, ferrophosphorus; mercurous or mercuric bromides, chlorides, iodides, thiocyanate, sulfate; molybdenum oxide, dioxydichloride, sulfides, hexacarbonyl, oxytetrachloride, chlorides, telluride, nitride, selenide; nickelous or nickelic chlorides, bromides, fluorides, iodides, sulfate, boride, borate, acetate, fluorophosphates, phosphate, phosphide; niobium nitride, sulfide, chlorides, bromides, iodides, phosphide; osmium chlorides, bromides, fluorides, oxides; palladium cyanide, iodides, chlorides, hydride; platinum chlorides, iodides; rhenium chlorides, sulfide, bromides, fluorides, oxytetrachloride, trioxy chloride; rhodium chlorides; ruthenium chlorides; tantalum sulfide, sulfide, nitride, bromides, chlorides, fluorides; titanium chlorides, bromides, fluorides, oxides, iodides, phosphide, sulfides; tungsten disulfide, hexacarbonyl, chlorides, bromides, oxide, oxytetrachloride; vanadium disulfide, bromides, chlorides, fluorides, telluride, selenide, phosphide, nitride, oxysulfate, oxytrichloride, oxytrifluoride, oxide; zinc bromate, fluoride, hexafluorosilicate, iodate, iodide, perchlorate, phosphate, phosphide, sulfide, tetrafluoroborate.

The complexed or ternary compounds may be strictly inorganic in nature or they may be complexed with a ligand such as a Lewis base. Examples of these types are as follows: tris (ethylene diamine) cupric sulfate, cupric ammonium sulfate, potassium tetracyano cuprate, aluminum chromate, barium dichromate cesium chromate, cesium dichromate, cobalt chromate, lithium chromate, lithium dichromate, manganese chromate, mercuric chromate, nickel chromate, potassium fluorochromate, sodium or potassium chromate, zinc chromate; ammonium cobalt sulfate, cobalt chromate, cobalt ferrite, cobalt hexachlorostannate, cobalt molybdate, cobalt stannate, cobalt tetrafluoroborate, lithium cobaltite, potassium hexacyano cobaltate, sodium hexanitrito cobaltate, ammonium hexaferrate, ammonium tetrachloroferrate, nickel ferrite, potassium ferric oxalate, potassium ferri sulfide, potassium hexafluoro ferrate, sodium hexafluoro ferrate, lithium dichromate, lithium hexafluoro titanate, lithium manganite, lithium molybdate, lithium permanganate, lithium tetraborate, lithium titanate, lithium zirconate, ammonium manganese sulfate, ammonium manganese phosphate, barium permanganate, calcium permanganate, magnesium permanganate, manganese chromate, manganese hexafluorosilicate; ammonium paramolybdate, barium molybdate, lithium molybdate, magnesium molybdate, nickel molybdate, potassium hexachloro molybdate, potassium molybdate, sodium phosphomolybdate, zinc molybdate, zirconium molybdate; nickel chromate, nickel ferrite nickel hexafluorosilicate, nickel titanate, nickel uranyl acetate, potassium nickel sulfate, uranyl nickel acetate, nickel stannate; ammonium tetrachloro palladate, ammonium hexachloro palladate, potassium hexapalladate, potassium tetrachloropalladate, sodium tetrachloropalladate; ammonium tetrachloroplatinate, ammonium hexachloroplatinate, potassium hexachloroplatinate, potassium hexaiodoplatinate, ammonium tetrachloroplatinate, sodium hexachloroplatinate; ammonium perrhenate, potassium perrhenate; potassium heptafluoro tantalate; ammonium hexafluorotitanate, barium titanate, bismuth titanate, cobalt titanate, lead titanate, lithium hexafluoro titanate, lithium titanate, magnesium titanate, nickel titanate, potassium and sodium hexafluoro titanate, tungsten titanium carbide; ammonium metavanadate, calcium pyrovanadate, lead vanadate, sodium metavanadate, sodium pyrovanadate, sodium vanadate; potassium zinc fluoride, zinc chromate, zinc hexafluoro silicate, zinc molybdate, zinc permanganate, zinc stannate, zinc tetrafluoroborate, zinc titanate, zinc zirconate; ammonium tetracyanochromoanilate (ammonium rhodanilate), potassium hexacyanatechromate, tris (ethylene diamine) chromium thiocyanate, tris (ethylene diamine) chromium chloride, tris (ethylene diamine) chromium sulfate; aquopentamminocobaltic chloride, chloropentamminocobaltic chloride, cobalt ferrocyanide, hexamminocobaltic chloride, nitratopentamminocobaltic nitrate, potassium hexacyanocobaltate, potassium trioxalatocobaltitate, tris (ethylene diamine) cobalt chloride, tris(ethylene diamine) cobalt sulfate; cobaltous hexamethylene tetramine; ammonium ferricyanide, ammonium ferricoxalate, ammonium ferrocyanide, calcium ferrocyanide, cobalt ferrocyanide, ferrous ethylene diamine sulfate, lithium ferricyanide, lithium ferrocyanide, lead ferrocyanide, potassium zinc ferrocyanide, potassium ferric oxalate, N,N-dimethylamino methyl ferrocene methiodide, tris (ethylene diamine) iron sulfate, zinc ferrocyanide; ammonium manganese sulfate, ammonium manganese phosphate, ammonium paramolybdate; hexamminonickel tetrafluoroborate, nickel ferrocyanide, potassium nickel cyanide, potassium nickel fluoride, potassium nickel sulfate, uranyl nickel acetate; diamminopalladous chloride; barium tetracyanoplatinate, diammino platinum dinitrite; potassium hexacyano ruthenate, tetraplatinum dinitrite; potassium hexacyano ruthenate, tetramminorutheniumhydroxychloro chloride, ammonium hexafluorotitanate, calcium hexafluorotitanate; ammonium phosphotungstate, ammonium tetrathiotungstate, ammonium tungstate, cobalt tungstate, sodium phosphotungstate; potassium zinc ferrocyanide, tetramminozinc tetrafluoroborate, and zinc ferrocyanide. Manganese dioxide and sodium dichromate are well-known oxidizing agents. They are useful treating agents in oil filters for minimizing sludge and rust formation of lubricating oils.

Many compounds of transition metals other than those above specifically mentioned, will successfully operate in accordance with the teachings of the present invention but it is believed that the various types of compounds which are operative are exemplified in full by the numerous compounds which are specifically set forth above. One of the objectives of the present invention is to remove the nitrogen oxides after they are formed and work their way into the lubricating oils during the operation of internal combustion engines. It is, therefore, desirable (but not necessary) as before stated, to avoid employing compounds containing nitrogen oxides in preference to the use of other compounds which do not possess nitrogen oxides in their structures. Such compounds will, in general, operate successfully especially in inhibiting rust formation but it is desired generally to avoid the use of such compounds because better results, as to sludge inhibition, are attained without their use.

Many of the heretofore specific inorganic compounds exist in anhydrous form and in many instances hydrates of these compounds are most readily available commercially. The hydrates may exist with more than one molecule, in fact, several moles of water are crystallized in association with their structures. In many instances, the hydrate form is the most commonly marketed form and is thus more generally readily available. There is little point, if this is the case, in attempting to employ the anhydrous form for the reason that once the compounds are incorporated into the oil system as hereinbefore described, almost immediately small amounts of water already present in the lubricating oil or eventually becoming present in the lubricating oil will contact the anhydrous salts and so they are, in effect, converted to the hydrated form. Mixtures of two or more of the above-defined types of transition metal binary or ternary compounds may also be employed as well as mixtures of other types of compounds with them.

The solid inorganic particles employed may range in size from between about −4 and about +250 mesh, preferably between about −20 and about +100 mesh Tyler screen size. The size of the solid particles is not critical but they should not be, in any event, of sufficiently small size that any substantial quantity of them will pass through the filter packing material and be circulated in the oil. If they are of sufficiently small particle size that they behave substantially as colloids in the oil, no harm is done since their action will still be effective on the degradative products in the oil. Preferably, however, the particles of the solid compounds should be retained in the filter or other contacting chamber.

Another method which may be employed for incorporating the transition metal compounds into the oil filter is to impregnate the filter packing material with an aqueous solution of such salts, in cases where the salts are readily water soluble, after which the impregnated material, for example, porous paper packing, may be gently heated to dryness to drive off the water and to maintain the compounds in intimate association with the packing material. No specific minimum amount of the transition metal compound is necessary or found to be critical, it being sufficient that all or a portion of the filter element, i.e., the packing in the filter, either contain impregnated thereinto one or more of the aforementioned compounds in solid form or that solid particles sufficient to inhibit corrosion and sufficiently large to be retained in the filter element are placed in and retained by the filter element. Solid particles of sufficient coarseness to be retained in the filter by the filter element or the filter packing material may be positioned at the inlet side of the filter or between layers of filter packing material so as to be largely retained therein for the service life of the filter or the coarse solid particles may be in a separate chamber in the oil circulation system ahead of or after a conventional oil filter. Usually, in the latter case, a fine mesh sreen (i.e. 325 mesh) serves as a support and retainer for the solid particles.

No specific structural design of the filter element is necessary. Preferably, the solid particles of transition compounds should be retained in the filter and not be entrapped or carried with the oil from the filter packing chamber, or filter, to the engine, although some small amounts in colloidal form or dissolved in the entrained water may be removed from the filter and be carried into the crankcase oil sump. In ordinary automotive internal combustion engines having an oil capacity of 4 to 5 quarts of lubricating oil, the oil filter or other chamber should contain, either as such or impregnated on the filter medium or other inert carrier, between about 10 to about 150 grams of the selected transition metal compound or compounds, in solid form. Such an amount is sufficient to enable the lfiter to retain, during its normal life of operation, the solid compounds over and beyond that amount taken up by any water with which the solid compounds come into contact during the course of the normal operation of the engine between oil changes. If desired, however, it is, of course, proper that larger or smaller amounts of such compounds be incorporated depending upon the particular usage of the engine and the amount of engine running time elapsing between filter changes or chamber rechargings.

If a carrier medium is to be employed (in practical operation this is advantageous), it is preferable that it be a relatively porous carrier and that it be relatively inert with respect to the oil and to the transition metal compounds. Any inert carrier is suitable, particularly a porous one, so long as the size of the solid carrier particles is sufficiently large to retain the particles in the filter during operation of the engine and during the circulation of the oil through the filter. Suitable carrier substances include porous paper, diatomaceous earth, kaolin, kieselguhr, activated clay, charcoal, or fullers earth, although any other inert, relatively porous or nonporous carrier is equally as useful so long as the carrier retains the solid transition metal compounds within the filter and solids-free oil, as an effluent from the filter, is permitted to be returned to the engine for reuse. In some cases, even coarse sand, which is inert, may serve as the filtering medium so long as it is retained within the filter and is not carried by the effluent oil to the engine.

Figure 2:
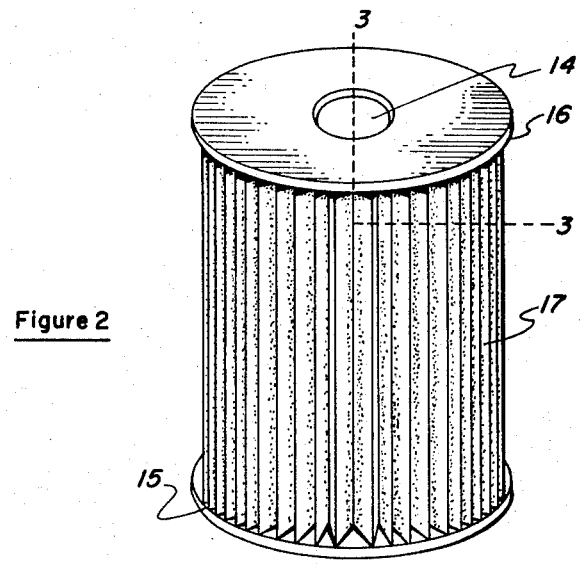
Figure 3:
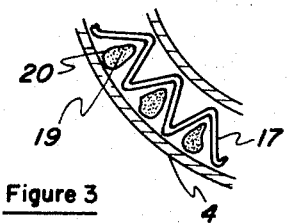
Figure 4:
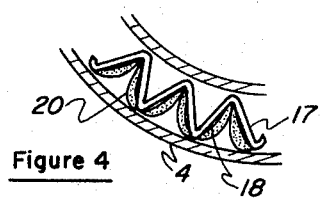

FIG. 1 represents a schematic sectional elevation of a conventional four-cylinder internal combustion automobile engine. FIG. 2 represents in diagrammatic form a conventional filter cartridge employed as an insert in oil filters for internal combustion automotive engines. FIGS. 3 and 4 represent alternative modifications for inserting in connection with the filter element of FIG. 2 the various transition metal compounds as used in conjunction for constructing a lubricating oil system in which these metal compounds are oil treating agents.

Referring now to FIG. 1, a conventional crankcase 3 contains a reservoir of lubricating oil which is conducted by means of a pump through line 10 into oil filter 4 containing a filter cartridge 14. The filtered oil is conducted by means of the oil pressure from the pump through exit line 11 having attached thereto oil gauge 9 to various parts of the engine to be lubricated such as the cam shaft 5 and by means of line 2 into the crank shaft 6. Also, the oil goes through connecting rod 7 up into piston 8 which is shown as only one of the four pistons. This is but a diagrammatic representation showing conventional flow of oil in the internal combustion engine.

FIG. 2 is an enlargement in detail of the oil filter cartridge 14 and is comprised essentially of a bottom sealer plate 15 and a head sealer plate 16, element 17 being a fluted porous paper fiber cartridge through which the oil is filtered for the purpose of removing solid impurities contained in the oil. Such filter cartridges are conventional.

FIGS. 3 and 4 show alternate methods of inserting next to the fluted porous paper filtering element packets or depositories for the transition metal compounds 18 and 19 which are themselves retained in porous paper 20 such as that commonly employed in tea bags. In FIG. 3 these "tea bags" are individually placed between the corrugation of filter element 17. In FIG. 4, these porous "tea bags" are made integral with each side of the flutings of the corrugated paper filter element 17.

The oils employed in association with the present invention are those customarily employed in lubricating internal combustion engines including automotive engines, and diesel engines, both of the light and heavy duty types, and, in fact, for lubricating any engine employing lubricating oils for the purpose of lubricating the bearings, piston walls, valves, etc., of such engines. These oils are many and of varied types. The invention and its success in the use of the transition metal compounds in oil filters do not depend upon the use of any particular lubricating oil but the invention is applicable to all such oils heretofore used in these lubrication systems. As is well known and recognized, these oils may be of paraffinic, naphthenic or mixed types and they may contain the conventional additives which are customarily and conventionally employed in such oils such as, for example, viscosity index (V.I.) improvers, pour point depressants, antioxidants, sludge dispersants, antiwear agents, etc.

In the comparative runs set forth in the following examples, a base oil blend of a solvent extracted neutral midcontinent oil of SAE 10W–30 grade was employed. It contained conventional additives such as about 10% of its weight of a V.I. improver, for example, polyisobutylene, between about 3.5 and about 4 wt. percent of a dispersant which was a polyisobutenylsuccinic anhydride imide derivative of tetraethylenepentamine, small amounts of a wax alkylated naphthalene as a pour point depressant, an antioxidant and an antiwear agent, namely, the zinc salt of di($C_4$–$C_5$ alkyl) dithiophosphate. Additionally, it contained less than 1% of an overbased calcium petroleum sulfonate. The oil as compounded has a pour point of about —20° F. maximum and a V.I. of about 136 minimum. As illustrative of the character of the invention but with no intention of being limited thereby the following examples are set forth.

EXAMPLE 1

A Ford 6-cylinder engine was run in a series of cyclic temperature sludge tests. The base oil blend employed was that previously described. In one series of tests, a filter commercially available and sold for use in automotive lubricating systems was employed. It consisted of a porous paper packing or filter element and has interspersed and retained within the paper filter element in separate porous paper containers about 52 grams of the specific transition metal compound or sand (control). In each case the test material employed had an average mesh particle size of between about 20 and about 40 standard Tyler screen size. The sand, however, had about a 30–40 mesh screen size on the same basis. The comparative cyclic temperature sludge test was carried out as follows. The engine was run under alternate controlled temperature cycles. The spark timing was set at 11° BTC (before top center). The air to fuel ratio was maintained between 13.7:1 and 14.5:1 and the engine was placed under constant load of 140 foot lbs. of torque and was run at 1500 r.p.m.±15 r.p.m. The first cycle lasted 5 hours and the oil sump temperature was maintained at 150° F., ±5° F. Following this, a second cycle lasted 2 hours, the oil sump temperature being maintained at 215° F., ±5° F. The two cycles were alternated, in sequence, until the desired total test hours had elapsed. Make-up was added as required so as to maintain the oil level in the crankcase at all times between about 5 and 5½ quarts. At the end of selected periods of test time, the engine was inspected by disassembling it sufficiently to permit visual examination of several of the parts, including the rocker arm assembly, rocker arm cover, the cylinder head, the push rod chamber and its cover, the crank shaft, and the oil pan. These parts were visually and quantitatively rated for sludge deposits using a CRC (Coordinating Research Council) Sludge Merit Rating System in which a numerical rating of 10 represents a perfectly clean part and the numerical scale decreases to a minimum value approaching 0 representing a part covered with the maximum amount of sludge possible. The sludge merit ratings of the various parts are averaged to give an overall engine sludge merit rating. In all tests, the filter element was one made of paper and is readily available on the open market. The comparative test runs gave the following data:

rust merit rating of 10 indicates no rust formation on the prescribed inspected internal engine parts and a rating of 1 indicates the worst possible rusting conditions. As shown by the data, the sodium chromate run, especial-

TABLE I.—CYCLIC TEMPERATURE SLUDGE TESTS

| Test, hours | Sand (control) | Hexammino cobaltic chloride | Cobaltous sulfate | Ferrous ammonium sulfate | Ferric hypophosphite | Potassium dichromate | Manganese oxide | Zinc phosphite | Cuprous chloride |
|---|---|---|---|---|---|---|---|---|---|
| 63 | 9.97 | 9.98 | 10.0 | 9.8 | 9.82 | 9.86 | 9.88 | 10.0 | 10.0 |
| 84 |  | 9.96 |  |  |  | 9.79 | 9.86 |  | 9.86 | 10.0 |
| 105 | 9.2 | 9.88 | 9.98 | 9.7 | 9.76 | 9.84 | 9.49 | 9.29 | 9.98 |
| 126 |  | 9.76 |  |  |  | 9.42 | 9.74 |  | 7.4 | 9.9 |
| 147 | 6.0 | 9.0 | 9.9 | 9.1 | 9.13 | 9.54 | 9.07 |  | 9.5 |
| 168 |  | 8.6 | 8.8 | 8.4 | 7.3 | 9.4 | 8.3 |  | 9.2 |
| 189 |  | 8.0 |  |  | 6.6 | 9.1 | 7.0 |  | 8.4 |
| 210 |  | 7.4 | 7.8 | 6.5 | 6.4 | 8.5 | 6.0 |  | 7.5 |
| 231 |  | 6.8 |  |  |  | 6.6 |  |  | 6.6 |
| 252 |  | 6.2 |  |  |  | 6.3 |  |  | 5.6 |

The blank or control test, i.e. that using sand as a filter packing material with the aforementioned oil blend, resulted in a sludge merit rating of 6 at the end of about 147 hours of operation whereas in the case of the use of cobaltous sulfate the same merit rating was not reached until some time beyond 210 hours of operation. On the other hand, with the use of ferrous ammonium sulfate, about 220 hours of operation were required before a sludge merit rating of 6.0 was reached. As the data show, potassium dichromate usage required about 252 hours of operation before a 6.3 rating was reached and ferric hypophosphite usage required more than 210 hours of operation to reach a merit of 6.0. Surprisingly, even manganese dioxide usage required 210 hours to attain a sludge merit rating of 6.0. It is readily apparent from the examination of these data that there is a vast difference in sludge formation and deposition as between the engine operated using a filter containing in effect no transition metal compound, i.e. sand, which was inert so far as any chemical action on the lubricating oil was concerned, and one containing one of the novel transition metal compounds.

EXAMPLE 2

A comparative rust test using the same base oil as employed in the runs shown and described in Example 1 and Table I, and designated MS IIB plus 2 hours of MS IIIB, as described beginning with page 4 and going through line 6 of page 11, ASTM Special Technical Publication No. 315–D, was also carried out. This test is designed to simulate short-trip (stop and go) service and evaluates the rusting characteristics of motor oils under most severe, or adverse, conditions.

The oil filter contained interspersed in its porous paper packing, separate porous paper containers retaining therein about 52 grams of sand, in one run, and a like amount of sodium chromate in a second comparative run. At the end of the designated 24 hours of operation of the MS IIB plus 2 procedure, the sand control showed a rust merit rating of 9.49 and the sodium chromate run showed a rust merit rating of 9.77. In another set of comparative runs in which the MS IIB plus 2 procedure was carried twice, in sequence, the rust rating for the sand control was 8.17 and for the sodium chromate was 9.52. A ly after 48 hours of operation, gave a vastly superior anti-rust conditions as compared with the sand control run.

Having now thus set forth the general nature and the specific embodiments of the invention, what is desired to be secured by Letters Patent is:

1. An oil filter for filtering a mineral lubricating oil being used in the operation of an internal combustion engine, said filter having retained therein solid particles of an oil-insoluble compound selected from the group consisting of sodium chromate, hexammino cobaltic chloride, cuprous chloride, manganese dioxide, and ferrous ammonium sulfate.

2. An oil filter as in claim 1 wherein the said oil-insoluble compound is associated with a carrier selected from the group consisting of porous paper, diatomaceous earth, kaolin, kieselguhr, activated clay, charcoal, and fuller's earth.

3. An oil filter as in claim 1 wherein the said oil-insoluble compound is sodium chromate.

4. An oil filter as in claim 1 wherein the said oil-insoluble compound is hexammino cobaltic chloride.

5. An oil filter as in claim 1 wherein the said oil-insoluble compound is cuprous chloride.

6. An oil filter as in claim 1 wherein the said oil insoluble compound is manganese dioxide.

7. An oil filter as in claim 1 wherein the said oil insoluble compound is ferrous ammonium sulfate.

References Cited

UNITED STATES PATENTS

| 1,734,197 | 11/1929 | Blumenberg, Jr. | 210—501 |
| 1,752,050 | 3/1930 | Young | 210—501 |
| 1,914,999 | 6/1933 | Maverick et al. | 210—501 X |
| 2,088,222 | 7/1937 | White | 210—501 |
| 2,685,565 | 8/1954 | Jones et al. | 210—501 UX |
| 2,785,805 | 3/1957 | Hough | 210—501 X |
| 3,327,859 | 6/1967 | Pall | 210—266 |

JOHN ADEE, Primary Examiner

U.S. Cl. X.R.

210—502, 506